(12) United States Patent
Joseph

(10) Patent No.: US 7,903,761 B2
(45) Date of Patent: Mar. 8, 2011

(54) UWB RADIO INTERFACE WITH DC OFFSET

(75) Inventor: Brian C. Joseph, McKinney, TX (US)

(73) Assignee: QUALCOMM Incorporated, San Diego, CA (US)

( * ) Notice: Subject to any disclaimer, the term of this patent is extended or adjusted under 35 U.S.C. 154(b) by 759 days.

(21) Appl. No.: 11/395,397

(22) Filed: Mar. 31, 2006

(65) Prior Publication Data

US 2007/0230622 A1 Oct. 4, 2007

(51) Int. Cl.
H04L 25/06 (2006.01)
H04W 4/00 (2009.01)
H04B 1/10 (2006.01)

(52) U.S. Cl. .................. 375/319; 370/338; 455/280

(58) Field of Classification Search .................. 375/319; 370/338, 442
See application file for complete search history.

(56) References Cited

U.S. PATENT DOCUMENTS

| | | | | | |
|---|---|---|---|---|---|
| 5,061,925 | A | * | 10/1991 | Sooch et al. | 341/120 |
| 5,422,889 | A | * | 6/1995 | Sevenhans et al. | 370/442 |
| 6,058,291 | A | * | 5/2000 | Ketcham | 455/46 |
| 6,240,100 | B1 | * | 5/2001 | Riordan et al. | 370/442 |
| 6,654,593 | B1 | * | 11/2003 | Simmons et al. | 455/234.1 |
| 2005/0153676 | A1 | * | 7/2005 | Ruelke et al. | 455/324 |
| 2005/0239428 | A1 | * | 10/2005 | Seendripu et al. | 455/280 |
| 2006/0270347 | A1 | * | 11/2006 | Ibrahim et al. | 455/41.2 |
| 2007/0140199 | A1 | * | 6/2007 | Zhao et al. | 370/338 |

FOREIGN PATENT DOCUMENTS

EP 0719013 A2 6/1996

OTHER PUBLICATIONS

International Preliminary Report on Patentability—PCT/US07/065549, The International Bureau of WIPO—Geneva, Switzerland, Sep. 30, 2008.
International Search Report and Written Opinion of the Search Report for PCT/US2007/065549, dated Sep. 18, 2007.

* cited by examiner

*Primary Examiner* — Mohammad H Ghayour
*Assistant Examiner* — Sarah Hassan
(74) *Attorney, Agent, or Firm* — Sam Talpalatsky; Nicholas J. Pauley; Jonathan T. Velasco

(57) ABSTRACT

The present invention provides a method and apparatus for correcting direct current (DC) offsets in radio output signals. The invention comprises a radio processor and a baseband processor. During a calibration routine, the baseband processor measures DC offset produced by the radio processor, generates a corresponding DC offset correction value, and writes the correction value to a discrete memory in the radio processor via a serial processor interface. During a subsequent normal receive operation, the radio processor reads the DC offset correction value from memory and feeds it into a into a digital to analog converter to produce an analog signal that in turn is fed into a radio receive path to nullify undesired DC offset.

16 Claims, 3 Drawing Sheets

UWB RADIO INTERFACE WITH DC OFFSET

TECHNICAL FIELD

The invention relates generally to wireless communication, and more specifically to the correction of DC offsets in radio output signals.

BACKGROUND OF THE INVENTION

Digital communication receivers that employ a direct conversion radio all suffer from a common problem. Due to the high amount of gain at baseband, these radios can often create large undesirable direct current (DC) offset in the output signal. DC offset is a DC bias voltage that is added to the input of a circuit or amplifier. If there is no correction for this offset, the radio is rendered non-functional.

A few schemes exist for correcting these DC offsets in the radio, which usually include injecting a DC current of the opposite sign into the radio to nullify the DC offset. Previously, the source of this correction current was from a second device external to the radio; typically, a baseband processor chip.

This mechanism requires a very high speed interface between the two devices dedicated to communicating the DC offset correction values. The interface can be either analog or digital, but both options have drawbacks.

The benefit of an analog interface is that it minimizes the number of pins which must be dedicated to this interface on each chip. The drawback of the analog interface is that it requires adding a digital to analog converter (DAC) to the baseband chip which is primarily a digital chip. This adds to the cost of the baseband processor.

A digital interface has the advantage of not requiring a DAC for the baseband processor. However, a digital interface may require many pins to represent the DC correction values with enough resolution, adding cost to both the radio and baseband processor.

Most current interfaces used for communicating the DC offset correction values are analog, primarily because they are less expensive than the digital interfaces. The baseband periodically enters a calibration routine wherein it measures the DC offset of each state of the radio and stores a correction factor in the baseband processor chip. During normal receive mode, the baseband processor then feeds the correction value corresponding with the radio's current state to the radio chip through this analog interface.

SUMMARY OF THE INVENTION

The present invention provides a method and apparatus for correcting direct current (DC) offsets in radio output signals. The invention comprises a radio processor and a baseband processor. During a calibration routine, the baseband processor measures DC offset produced by the radio processor, generates a corresponding DC offset correction value, and writes the correction value to a discrete memory in the radio processor via a serial processor interface. The location of the DC offset correction value within the radio processor memory is determined by the radio state for which the value is generated. The radio state is based on gain state and center frequency state information which is conveyed digitally between the baseband processor and radio processor. The memory holds a DC offset correction value for every radio state that requires a unique DC offset correction value. During normal receive operation, the radio processor reads the DC offset correction value from memory and feeds it into a into a digital to analog converter to produce an analog signal that in turn is fed into a radio receive path to nullify undesired DC offset.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION

The present invention provides a method and apparatus for eliminating the need for a high speed digital or analog interface dedicated to communicating DC offset correction values. The invention uses a "thin" interface, in that it requires very few interface pins. The elimination of the dedicated interface reduces the cost of both the radio and the baseband processor chips.

The invention uses a serial processor interface which may be incorporated into both the baseband and radio chips exclusively to convey the DC offset correction values. Typically, both chips already have such a serial processor interface to communicate other control information, which can also be used to convey the offset values.

The invention includes digital interfaces between the radio and baseband processor for any interface that can effect a change in the radio which would require a change to the current DC correction value used. Typically, a unique DC offset correction value is required for each combination of gain state and center frequency state. Therefore, the interfaces that convey gain and center frequency state between the baseband processor and radio are digital.

A memory on the radio chip holds a DC offset correction value for every radio state that could require a unique DC offset correction value.

During a calibration routine, the baseband processor measures the DC offset produced by the radio in each state, generates a corresponding DC offset correction value and writes this correction value to the memory in the radio chip. The location of the value within the memory is determined by the radio state for which the value is generated. A digital value is required for accessing discrete memory, which is why the radio state information is maintained in the radio chip and/or communicated to the radio digitally.

During normal receive operation, the radio uses its digital state value to address the memory and read out a DC offset correction value. It then feeds the correction value to a digital to analog converter (DAC) that converts the value into an analog signal and feeds it into the radio receive path to nullify the undesired DC offset. Because the radio typically uses the gain and center frequency to address the memory, and because the memory is preprogrammed during the calibration stage, no additional interfaces are required between the radio and baseband processor to communicate the DC correction values during normal receive operations.

Figure 1:
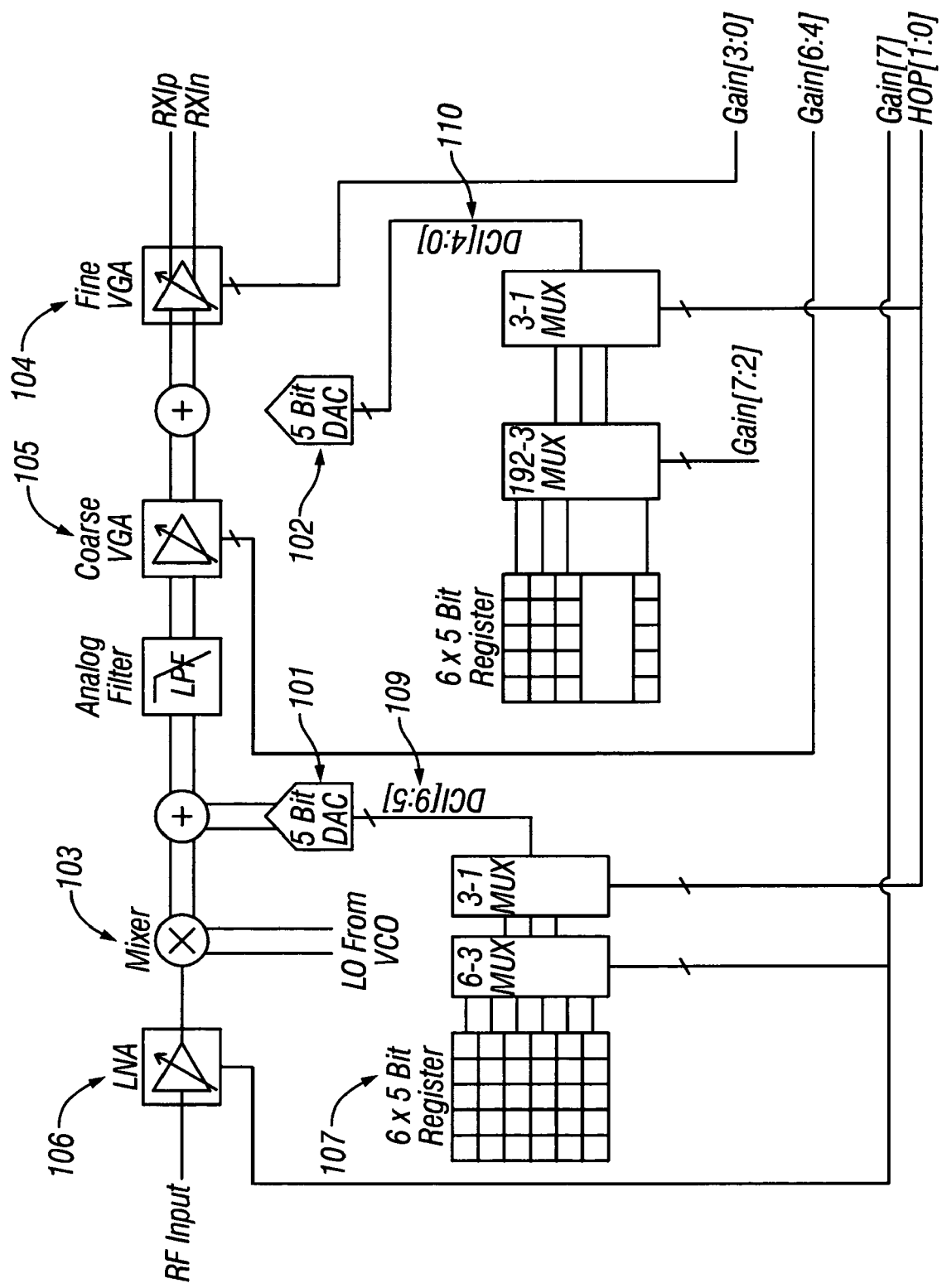
FIG. 1 is a block diagram of a receiver I channel with DC offset correction in accordance with an embodiment of the present invention.

FIG. 1 is a block diagram of a receiver I channel with DC offset correction in accordance with an embodiment of the present invention. Given the high level of gain and the various ways in which significant static and dynamic offsets can be generated, DC offset control is essential for the successful operation of a zero intermediate frequency (IF) receive strip. In one embodiment of the invention, each I and Q receive channel includes two differential, current output DACs 101, 102, as shown in FIG. 1. These DACs modify the offset conditions at both points of the baseband strip to ensure that the final DC offset presented to the I and Q analog to digital converters (ADCs) is within a range of, e.g., +/−15 mV.

FIG. 1 shows the correction mechanism for the I channel. All the DACs, registers and multiplexers are duplicated on the Q channel as well. The first five-bit DAC 101 reduces the DC offset at the output of the mixer 103 to a tolerable level for the remaining baseband blocks. The second five-bit DAC 102 reduces the offset at the input to the fine variable gain amplifier (VGA) 104 to a level low enough that the offset at the ADC input will be <15 mV even with the fine VGA 104 in its maximum gain state. The DACs 101, 102 are controlled from the pre-calibrated memory on the radio chip.

As explained above, an offline calibration is performed periodically at the command of the baseband processor. During offline calibration, the low-noise amplifier (LNA) 106 input is isolated from the antenna, and the DC offset is measured and corrected at 64 of the 256 gain states for each of the three carrier frequencies. The two least significant bits (LSBs) of the gain control word are not calibrated. In one embodiment, the LSBs are set to '11' for the duration of the calibration.

The calibration is performed in three stages with the receiver returning to operational receive mode in between each stage of calibration. The three stages of the calibration correspond to the three different carrier frequencies. The 10-bit DC offset correction factors for each gain state and carrier frequency are stored in memory on the radio chip.

Figure 2:
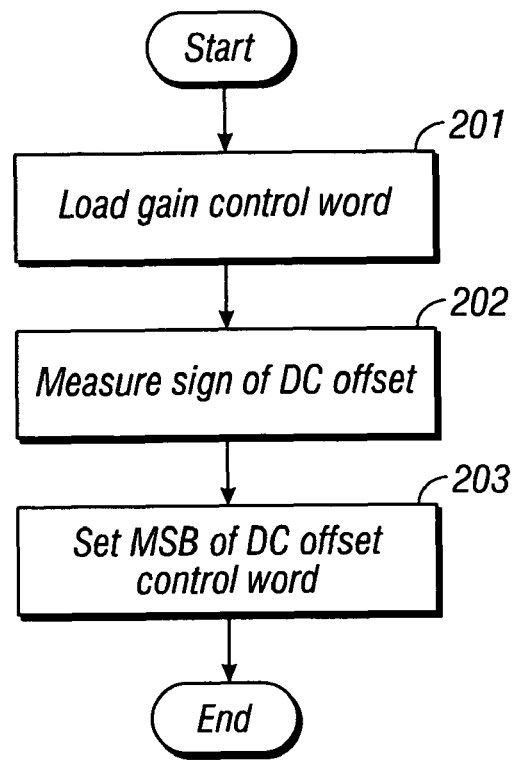
FIG. 2 is a flowchart of the algorithm used to calibrate the DC offset in accordance with an embodiment of the present invention.

FIG. 2 is a flowchart of the algorithm used to calibrate the DC offset in accordance with an embodiment of the present invention. Calibration of the DC offset at a single gain state is performed using a simple binary search algorithm. First, the gain control word is loaded (step 201). The baseband processor then measures the sign of the DC offset (step 202). The most significant bit (MSB) of the DC offset control word is set based on the polarity of the measured DC offset (step 203). This process is repeated for each of the 9 remaining bits of the DC offset control word, thus minimizing the DC offset at the ADC input of the baseband processor. The DC offset calibration algorithm is controlled by the baseband processor and can be further optimized for speed and accuracy based on the measured performance of the IC.

Referring back to FIG. 1, the DC offset at the mixer output does not vary significantly with changes in the coarse VGA 105 gain and fine VGA 104 gain. Only the LNA gain setting and the carrier frequency will have a significant effect on this offset. As such, the five-bit control to the first DAC 101 only requires updating when the LNA gain is changed or the carrier frequency is changed. Therefore, DCI [9:5] 109 and DCQ [9:5] (not shown) only have 6 discrete values for all gain states and carrier frequencies. These 6 sets of values are stored in a 6×10 bit register 107.

The DC offset at the input to the fine control VGA 104 will change significantly with the gain of the coarse VGA 105. Therefore, DCI [4:0] 110 and DCQ [4:0] (not shown) are updated every time the coarse VGA gain is changed. The calibrated values for these correction factors are stored in a 192×10 bit register 108 (64 gain states and three frequencies).

Changes in gain of the fine VGA 104 should not significantly impact the DC offset at the fine VGA input. As such, it is necessary to update DCI [4:0] 110 and DCQ [4:0] every time the fine VGA gain is changed. However, due to potential LSB inaccuracies in the DC offset calibration, the optimum DC correction factor may change with the fine VGA gain setting. Therefore, the calibration is performed for the two MSBs of the fine VGA control. This means that the maximum gain change between calibrated states is 4 dB.

Figure 3:
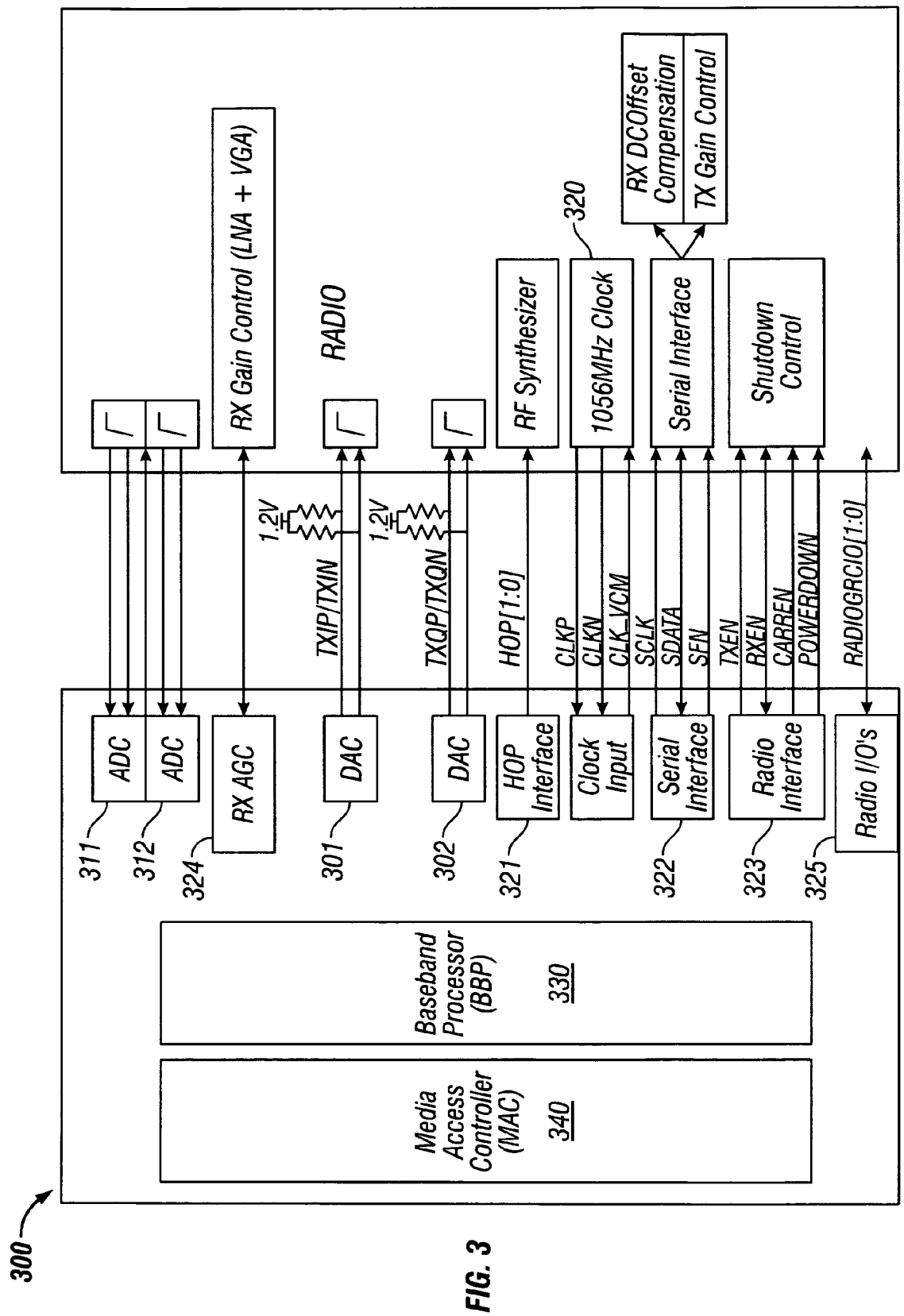
FIG. 3 is a block diagram depicting the interface with the radio in accordance with an embodiment of the present invention.

FIG. 3 is a block diagram depicting the interface with the radio in accordance with an embodiment of the present invention. The analog interface with the radio 300 consists of two differential Transmit DACs 301, 302, two differential Receive ADCs 311, 312, and one differential 1056 MHz baseband clock signal 320.

For the Transmit Digital to Analog Converters (TX DACs) 301, 302 in the example embodiment, each of the Transmit differential pairs (TXIP/TXIN and TXQP/TXQN) is driven by a current steering DAC running at a sample rate of 1056 MHz. The output full-scale range can be scaled in five discrete steps from a maximum of 5 mA to a minimum of 1 mA. At the DAC mid-scale, the output current is zero. It is required to externally load each line with 50 Ohms (100 Ohm differential), to a common mode voltage of 1.2V.

For example, if the maximum full-scale range is selected to be 5 mA the current flowing into the external 100 Ohm differential load will produce 500 mV peak-to-peak differential voltage at the transmit baseband I and Q inputs of the radio. To minimize loading and in order to retain the wide bandwidth of the Transmit DACs, it is recommended that the radio exhibits high differential input impedance (>3 kOhm differential) with maximum input differential capacitance of 2 pF.

Figure 4:
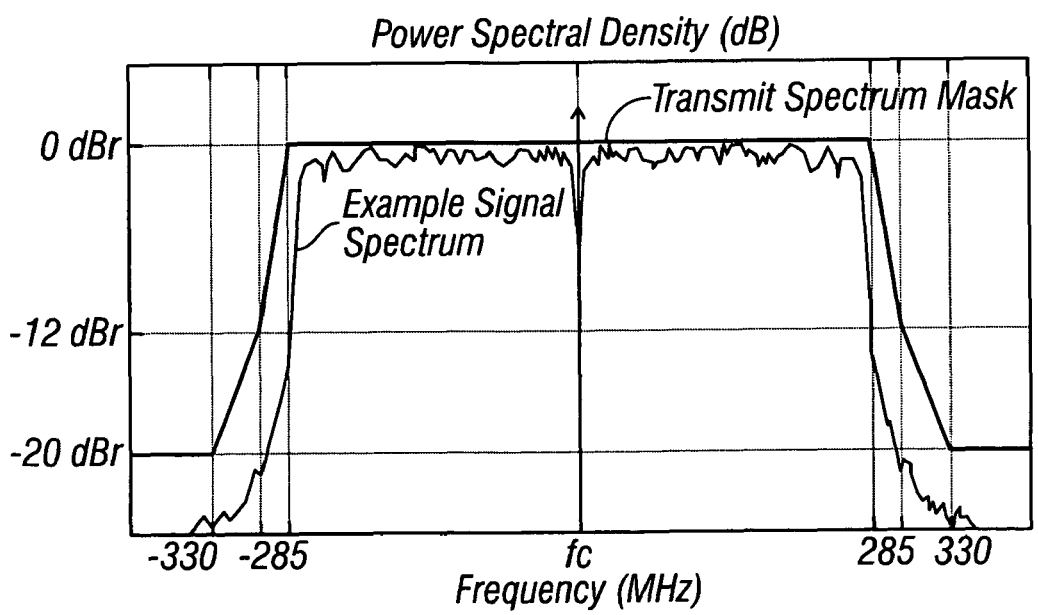
FIG. 4 graphically depicts the WiMedia transmit Power Spectral Density requirements.

FIG. 4 graphically depicts the WiMedia transmit Power Spectral Density requirements. The input to the DACs is digitally filtered so that the wideband Orthogonal Frequency Division Multiplexing (OFDM) waveform conforms to WiMedia specifications of −12 dBr at 285 MHz frequency offset and −20 dBr at 330 MHz frequency offset. In one embodiment, the radio encompasses, at a minimum, a third order Low Pass Filter with 3 dB cut-off frequency at 275 MHz and a flat magnitude pass-band with linear phase response. The filter is necessary to suppress the image created by the 1056 MHz sampling frequency with minimal distortion of the wideband baseband signal.

For the Receive Analog to Digital Converters (RX ADCs) 311, 312 in the example embodiment, each of the Receive differential pairs (RXIP/RXIN and RXQP/RXQN) feeds a DC coupled ADC running at a sampling frequency of 1056 MHz. The maximum input differential voltage is 600 mV peak to peak. The receive waveforms are to be centered at the 0.9V common mode voltage provided as a reference by the baseband processor 330.

The 1056 MHz reference clock 320 is used to enable the operation of the Transmit DACs, Receive ADCs, Baseband processor 330 and the Media Access Controller 340. The 1056 MHz clock is a DC coupled input with a maximum of 600 mV peak-to-peak differential voltage. The 0.9V common mode voltage is provided by the baseband processor 330 and used by the radio to accommodate the DC level shifting of the differential clock lines. The reference clock tolerance is within ±20 ppm.

The baseband digital interface with the radio consists of a HOP Interface 321, a 3-wire Serial Programming Interface 322, a Radio Interface 323, a Receive Automatic Gain Control (RX AGC) 324, and two general purpose I/O control signals 325.

The WiMedia Physical Layer specifies seven Time Frequency Codes (TFC). Each TFC indicates a hopping pattern. Only the first four (TFC 1-4) actually hop. The last three (5-7) stay on one channel. Table 1 shows the hopping patterns on Band Group 3, which represent only one of the 5 WiMedia defined Band Groups.

TABLE 1

| TFC | BAND_ID ($n_b$) for TFC in Band Group 3* | | | | | |
|---|---|---|---|---|---|---|
| 1 | 7 | 8 | 9 | 7 | 8 | 9 |
| 2 | 7 | 9 | 8 | 7 | 9 | 8 |
| 3 | 7 | 7 | 8 | 8 | 9 | 9 |
| 4 | 7 | 7 | 9 | 9 | 8 | 8 |
| 5 | 7 | 7 | 7 | 7 | 7 | 7 |
| 6 | 8 | 8 | 8 | 8 | 8 | 8 |
| 7 | 9 | 9 | 9 | 9 | 9 | 9 |
| | time --> | | | | | |

*The relationship between center frequency, $f_c$, and BAND_ID number, $n_b$, is $f_c(n_b) = 2904 + 528 \times n_b$ (MHz).

The non-hopping TFCs number 5, 6, 7 do not hop rather stay on one of the three frequencies in a uniband.

In one embodiment, the radio is directed to hop to the next Band_ID in the sequence every 312.5 ns. The digital control lines HOP[1:0] manage the hopping pattern of the radio 300 in a manner that is pre-programmed in the baseband processor 330. Table 2 lists example default values for defining the values of HOP[1:0] with the accociated Band_ID.

TABLE 2

| Default HOP[1:0] settings versus BAND_ID ($n_b$) | |
|---|---|
| HOP[1:0] | BAND_ID ($n_b$) |
| 00 | 1, 4, 7, 10, 13 |
| 01 | 2, 5, 8, 11, 14 |
| 10 | 3, 6, 9, 12 |

The 3-wire Radio Serial Interface (RSI) 322 serves as mechanism to read from or write to the radio registers. As the name implies, the interface is comprised of three signals: SCLK, SDATA and SEN. SCLK is an output to the radio and its purpose is to clock the data in or out of the radio registers at a programmable speed of 66 MHz, 33 MHz or 6 MHz. SEN is an active low output to the radio that indicates the validity of the clocked data. SEN remains low during the entire read or write cycle. SDATA is a bi-directional port that is used to write or read the address and data to and from the radio registers. In one embodiment, SDATA can be maximum 17-bits: 4 address bits, 1 R/W bit to indicate to the radio if the baseband processor is reading or writing data, and 12 data bits. The order is LSB to MSB, with the first of the 4 address bits clocked first and the last of the 12 data bits clocked last.

In case the register address and data do not align with the settings of the RSI, an alternate method can be implemented that is controlled by firmware utilizing three MAC General Purpose Input/Outputs. In this alternate method there is no limitation to the maximum length or order of address, R/W, and data. However, the disadvantage of this approach is that the maximum speed can not be faster than 155 MHz.

In a preferred embodiment of the invention, the transmit control of the radio is performed via the RSI as well. Each of the bands for the radio can be programmed during power-up as well as during the calibration period.

The preferred embodiment also incorporates internal power and temperature detectors into the radio that can be stored in the radio registers. A table in the baseband processor can be populated either during characterization or off-line calibration. Using the RSI the baseband processor can read both the temperature and power detector registers and use the values to adjust the transmit power levels accordingly.

In the case wherein the radio uses direct conversion architecture the baseband processor has the ability to read the DC offset and use the serial radio interface to program any calibration information required to maintain <15 mV of DC offset.

The AGC 324 works by cycling between three basic states: 1) measuring incoming power, 2) adjusting gain control outputs to the radio, and 3) waiting for gain adjustments to take effect and settle. In this manner it successively approximates the true gain of the signal; each iteration getting closer to the correct gain.

There are three categories of gain control signals that the AGC produces. The first category is Large step LNA (Low Noise Amplifier/Attenuator). In this category, the signal is either on or off and is usually a large gain step (about 20-30 dB). The AGC should not be toggled more than once per packet and should only be adjusted during the initial acquisition phase that lasts a maximum of 6 OFDM symbols. This category affects all three channels the same.

The second category is Coarse VGA (Variable Gain Amplifier/Attenuator). This category usually has about 32 to 64 distinct settings or an analog control signal and covers a range of about 40-64 dB. The gain steps can be large (about 6 dB per step). Like the Large step LNA, Coarse VGA should be adjusted during the initial acquisition phase that lasts a maximum of 6 OFDM symbols and affects all three channels the same.

The third category of gain control signals is Fine VGA. It is expected to have between 4 and 16 levels controllable by a digital signal and cover a range of about 9 dB. Gain steps are typically small (about 0.5 or 1 dB per step). These signals are adjusted only during the fine gain tracking phase, once per OFDM symbol. This category of gain signal will find three unique values per packet, one for each channel. For each packet the FVGA will cycle through the three values found during acquisition.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. An apparatus for correcting direct current (DC) offsets in radio output signals, comprising:
   (a) a radio processor chip;
   (b) a baseband processor chip; and
   (c) a serial processor interface configured to convey information between the radio processor chip and the baseband processor chip, wherein, during a calibration routine, the baseband processor chip measures DC offset produced by the radio processor chip, generates a corresponding DC offset correction value, and writes said correction value to a discrete memory in the radio processor chip via the serial processor interface; and wherein, during normal receive operation, the radio processor chip reads said DC offset correction value from memory and feeds it into a radio receive path to nullify undesired DC offset.

2. The apparatus according to claim 1, wherein the serial processor interface communicates the DC offset correction value from the baseband processor chip to the radio processor chip.

3. The apparatus according to claim 1, wherein the location of the DC offset correction value within the radio processor chip memory is determined by the radio state for which the value is generated, wherein the radio state is based on gain state and center frequency state.

4. The apparatus according to claim 3, wherein the memory holds a DC offset correction value for every radio state that requires a unique DC offset correction value.

5. The apparatus according to claim 1, comprising digital interfaces that convey gain state information and center frequency state information between the baseband processor chip and radio processor chip.

6. The apparatus according to claim 1, wherein during the normal receive operation, the DC offset correction value is fed into a digital to analog converter to produce an analog signal.

7. A method for correcting direct current (DC) in radio output signals, the method comprising:
(a) measuring DC offset produced by a radio processor chip;
(b) generating a corresponding DC offset correction value in a device external to the radio processor chip;
(c) writing said correction value to a memory in the radio processor chip via a serial processor interface; and
(d) during normal receive operation, reading said DC offset correction value from the radio processor memory and feeding it into a radio receive path to nullify undesired DC offset.

8. The method according to claim 7, wherein the location of the DC offset correction value within the radio processor chip memory is determined by the radio state for which the value is generated, wherein the radio state is based on gain state and center frequency state.

9. The method according to claim 8, wherein the memory holds a DC offset correction value for every radio state that requires a unique DC offset correction value.

10. The method according to claim 7, wherein steps (a) through (c) are performed by a baseband processor.

11. The method according to claim 7, wherein step (d) further comprises feeding the DC offset correction value into a digital to analog converter to produce an analog signal.

12. An apparatus, comprising:
means for measuring direct current (DC) offset produced by a radio processor chip;
means for generating a corresponding DC offset correction value in a device external to the radio processor chip;
means for writing said correction value to a memory in the radio processor chip via a serial processor interface; and
means for reading said DC offset correction value from the radio processor memory and feeding it into a radio receive path to nullify undesired DC offset during normal receive operation.

13. A digital communication receiver, comprising:
an antenna;
a radio processor chip;
a baseband processor chip; and
a serial processor interface configured to convey information between the radio processor chip and the baseband processor chip,
wherein, during a calibration routine, the baseband processor chip measures direct current (DC) offset produced by the radio processor chip, generates a corresponding DC offset correction value, and writes said correction value to a discrete memory in the radio processor chip via the serial processor interface, and
wherein, during normal receive operation using the antenna, the radio processor chip reads said DC offset correction value from memory and feeds it into a radio receive path to nullify undesired DC offset.

14. The apparatus according to claim 1, wherein the serial processor interface is incorporated into both the radio processor chip and the baseband processor chip exclusively to convey DC offset correction values.

15. The method according to claim 7, comprising conveying gain state information and center frequency state information to the radio processor chip using digital interfaces.

16. The method according to claim 7, wherein DC offset correction values are exclusively conveyed via the serial processor interface.

* * * * *